(12) United States Patent
Mair

(10) Patent No.: US 6,409,280 B1
(45) Date of Patent: Jun. 25, 2002

(54) TRUCK AND TRAILER HUB

(76) Inventor: Douglas Mair, 7785 Cote de Liesse, St-Laurent, Quebec (CA), H4T 1G3

(*) Notice: Subject to any disclaimer, the term of this patent is extended or adjusted under 35 U.S.C. 154(b) by 0 days.

(21) Appl. No.: 09/853,764

(22) Filed: May 14, 2001

Related U.S. Application Data

(60) Provisional application No. 60/239,034, filed on Oct. 10, 2000.

(51) Int. Cl.$^7$ .................. B60B 27/00; B60B 35/00; F16D 65/14; B61H 13/36
(52) U.S. Cl. .................. 301/105.1; 301/124.1; 180/905; 188/219.1; 188/206 A; 188/206 R
(58) Field of Search .................. 301/105.1 I, 124.1, 301/6.1; 180/905; 188/218 R, 219.1, 220.1, 205 R, 206 R, 206 A, 207, 208, 214

(56) References Cited

U.S. PATENT DOCUMENTS

| | | | | |
|---|---|---|---|---|
| 3,856,323 A | * | 12/1974 | Arning et al. | 188/206 R |
| 6,089,361 A | * | 7/2000 | Davison et al. | 188/206 R |
| 6,148,968 A | * | 11/2000 | Davison | 188/206 A |
| 6,279,695 B1 | * | 8/2001 | Davison | 188/206 A |

* cited by examiner

*Primary Examiner*—S. Joseph Morano
*Assistant Examiner*—Jason R. Bellinger
(74) *Attorney, Agent, or Firm*—Ogilvy Renault; Guy J. Houle

(57) ABSTRACT

A truck and trailer hub of the type having a cylindrical portion defining an aperture, whereby the hub is adapted for mounting on a spindle of an axle such as to be free to rotate on the spindle. The hub has a flange projecting outwardly from an outer surface of the cylindrical portion. The flange comprises throughbores therein, whereby the flange is adapted for securing a wheel and brake drum assembly thereto, such that the wheel and brake drum assembly can rotate with the hub and brake therewith when a brake member of the axle is actuated on a portion of the wheel and brake drum assembly by a cam shaft. The flange has at least one notch therein such that the cam shaft may be removed by pulling it through the notch without the hub requiring to be removed from the spindle.

6 Claims, 4 Drawing Sheets

TRUCK AND TRAILER HUB

This application claims benefit of Prov. No. 60/239,034 filed Oct. 10, 2000.

FIELD OF THE INVENTION

The present invention relates to trucks and trailers and, more particularly, to wheel and axle assemblies thereof.

BACKGROUND OF THE INVENTION

In the past few years, brake safety for truck and trailers has been on the forefront due to several horrific accidents prompting governments to act. As a result, automatic slack adjusters and stroke warning indicators have been provided therefor.

On the other hand, the freight industry has become increasingly competitive over the years. In some instances, the quality of materials and products has suffered as a result thereof. With stricter regulation, maintenance has been required in order to correct defective or inadequate truck/trailer axle assemblies. For instance, brake system components of trailers have been subject to frequent repairs. The brake systems typically comprise a cam shaft having an S-cam at an end thereof. The cam shaft is actuated at a free end thereof such as to be journaled in bushings secured to the axle of the trailer or truck, whereby the S-cam actuates brake shoes against a brake drum of the wheel.

According to new government ruling, the bushings need to be replaced when the cam shaft is slightly loose therein. This is to ensure a generally optimal braking, which occurs when the braking cylinder actuates the cam shaft at a 90 degree angle therewith. However, the change of bushing is costly in materials and labour as a hub holding the wheel needs to be removed to effectuate the repair. This is so because the hub interferes with the S-cam such that the cam shaft can not be pulled out of the bushings. Consequently, the hub needs to be removed. When the hub system is put back in place, it requires to be relubricated, and this also involves providing new sealing elements and lubricants to the hub. Also, the above described operation requires meticulous handling in order to avoid having abrasive particles, such as sand or dust, infiltrate the sealed hub systems. Consequently, the hub sealing is labour intensive and therefore costly.

SUMMARY OF THE INVENTION

It is a feature of the present invention to provide a hub for trucks/trailers which substantially overcomes the disadvantages of the prior art.

According to the above feature of the present invention, and from a broad aspect thereof, the present invention provides a truck/trailer hub of the type having a generally cylindrical portion defining an aperture, whereby the hub is adapted for mounting on a spindle of a truck/trailer axle such as to be free to rotate on the spindle. The hub has a flange projecting outwardly from an outer surface of the cylindrical portion. The flange comprising a plurality of throughbores therein, whereby the flange is adapted for securing a wheel of a truck/trailer thereto, such that the wheel can rotate with the hub and brake therewith when a brake member of the truck/trailer axle is actuated on a portion of the wheel by a cam shaft. The flange has at least a notch therein such that the cam shaft may be removed by pulling it through the notch without the hub requiring to be removed from the spindle.

According to a further broad aspect of the present invention there is provided a method for removing a brake actuating cam shaft from a truck/trailer axle, comprising the steps of (i) removing a wheel mounted on a hub of a truck/trailer axle; (ii) aligning a notch in the hub with the cam shaft by rotating the hub about the truck/trailer axle; and (iii) removing the cam shaft from the truck/trailer axle by pulling the cam shaft through the notch.

BRIEF DESCRIPTION OF THE DRAWINGS

A preferred embodiment of the present invention will now be described in detail having reference to the accompanying drawings in which.

DESCRIPTION OF PREFERRED EMBODIMENTS

Figure 1:
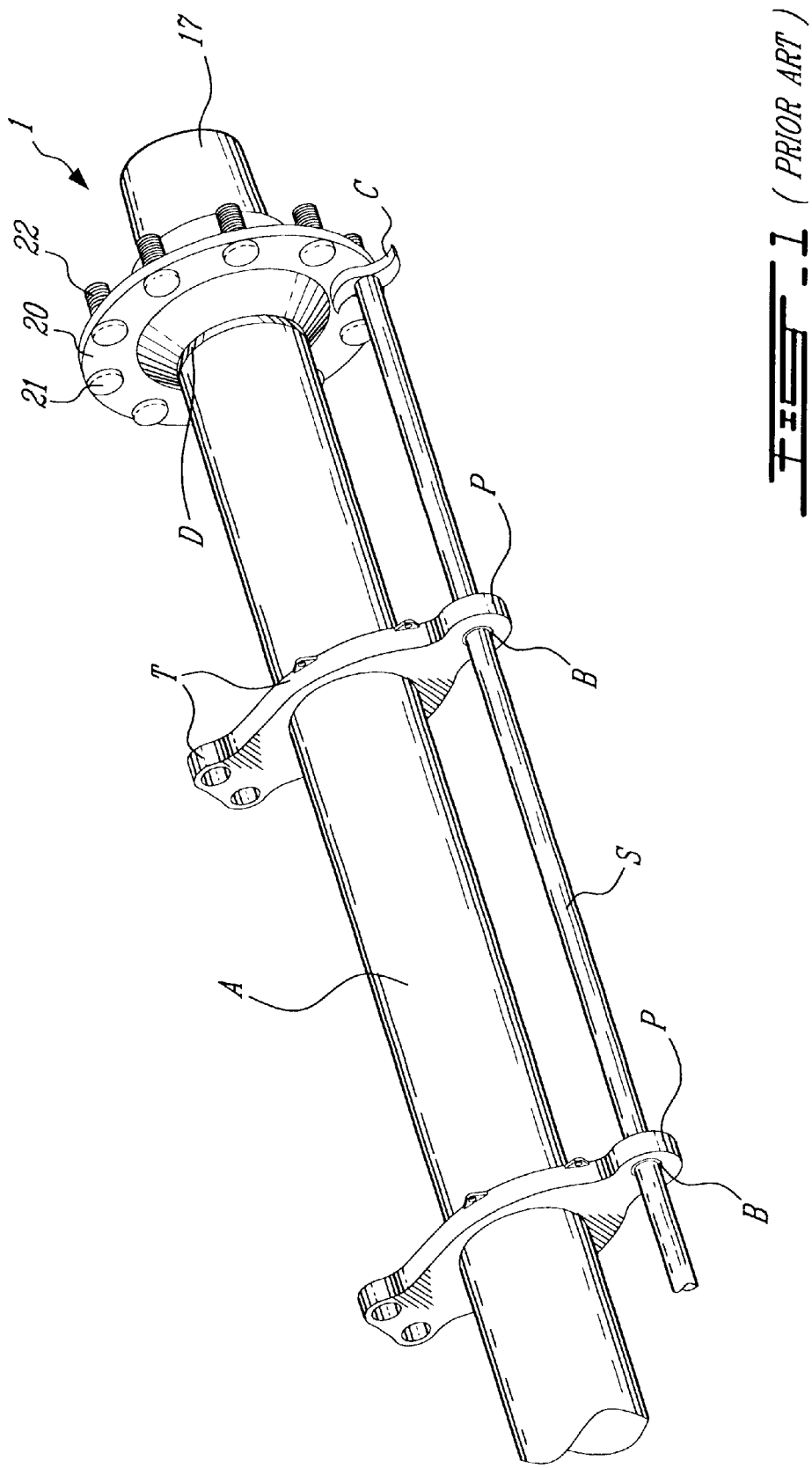
FIG. 1 is a perspective view of a truck/trailer hub in accordance with the prior art as mounted on a truck/trailer axle.

According to the drawings and, more particularly, to FIG. 1, a hub 1 in accordance with the prior art is shown operatingly mounted on an axle A of a truck/trailer. The axle A is stationary and has at opposed ends thereof (only one end shown) spindles D upon which the hub 1 is mounted. The hub 1 rotates about the spindle D by being mounted to a pair of bearings (not shown). The hub 1 and bearing assembly is sealed by a lip seal (not shown) on an inner side of the hub 1 and by a casing 17 with a gasket (not shown) on an outer side of the hub 1, whereby the hub 1 and bearing assembly encloses a lubricating fluid. It is pointed out that all this is well known in the art.

Figure 2:
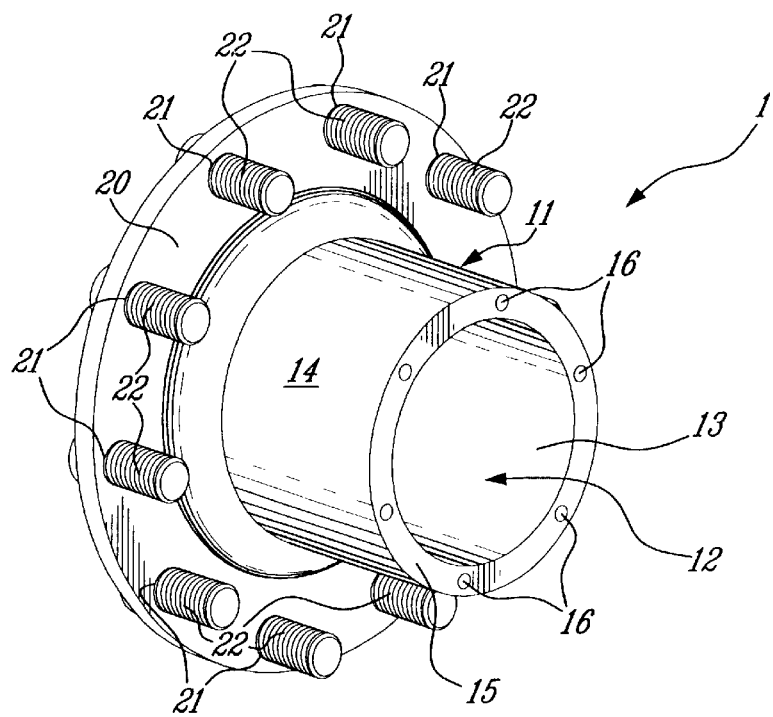
FIG. 2 is a perspective view of the truck/trailer hub in accordance with the prior art, as viewed from an outer side thereof.

Referring now to FIG. 2, the truck/trailer hub 1 in accordance with the prior art is shown in more detail. The truck/trailer hub 1 comprises of cylindrical portion 11 having an aperture 12, an inner surface 13, and an outer surface 14. The aperture 12 and the inner surface 13 are adapted to be mounted to the axle A of a truck/trailer, as shown previously in FIG. 1, by being interfaced to the spindle of the axle A by bearings. The bearing and hub assembly is secured to the spindle by a fastener such as a hexagonal nut.

Referring to both FIGS. 1 and 2, the cylindrical portion 11 has an outer edge 15 on an outer end thereof upon which are circumferentially disposed a plurality of tapped holes 16, whereby the casing 17 may be secured to the outer edge 15. The gasket (not shown) is sandwiched between the outer edge 15 of the cylindrical portion 11 and the casing 17, thereby ensuring the sealing therebetween.

A flange 20 is adjacent an inner end of the cylindrical portion 11 and projects radially outwardly from the outer surface 14 thereof. A plurality throughbores 21 (e.g. ten throughbores) are circumferentially disposed on the flange 20 and are equidistantly spaced from one another. The flange 20 and the throughbores 21 are adapted for receiving a wheel assembly (not shown), which is secured thereto by hub bolts 22. The wheel assembly is comprised of a wheel (including at least one tire) and a brake drum secured to the wheel to rotate therewith.

The wheel assembly is braked by a pair of brake shoes (not shown) being actuated against the brake drum. The brake shoes are mounted to the axle A on the support T, and are actuated by an S-cam C at an end of a cam shaft S. The cam shaft S is journaled in bushings B, which are disposed in pillow blocks P integrally formed with the axle A.

The bushings B and the cam shaft S must sustain great loads as they transmit the bushing power of a cylinder to the brake shoes. Consequently, the bushings and/or the cam shaft S must often be attended to for repair and/or replacement. As seen in FIG. 1, in order to remove the cam shaft S from the pillow blocks P, the former must be pulled parallel to the axle A, which is not possible unless the hub 1 is removed from the axle. In doing so, the hub and bearing assembly must be dismounted, whereby the sealing thereof is undone. In addition to being time consuming, the reassembling operation requires new sealing elements, such as the lip seal and the gasket, and new lubricating fluid.

Figure 3:
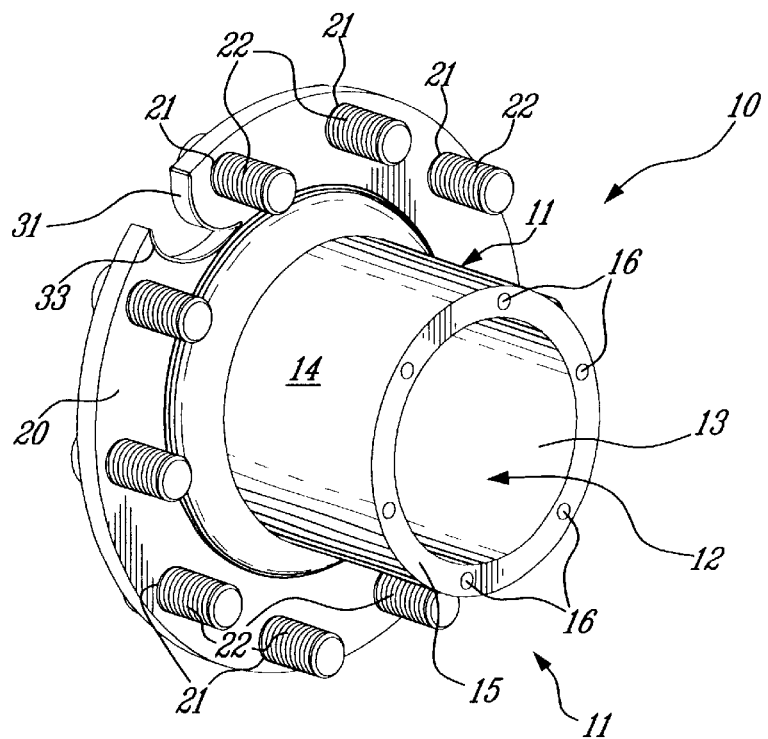
FIG. 3 is a perspective view, similar to FIG. 2, of a truck/trailer hub in accordance with the present invention.
Figure 4:
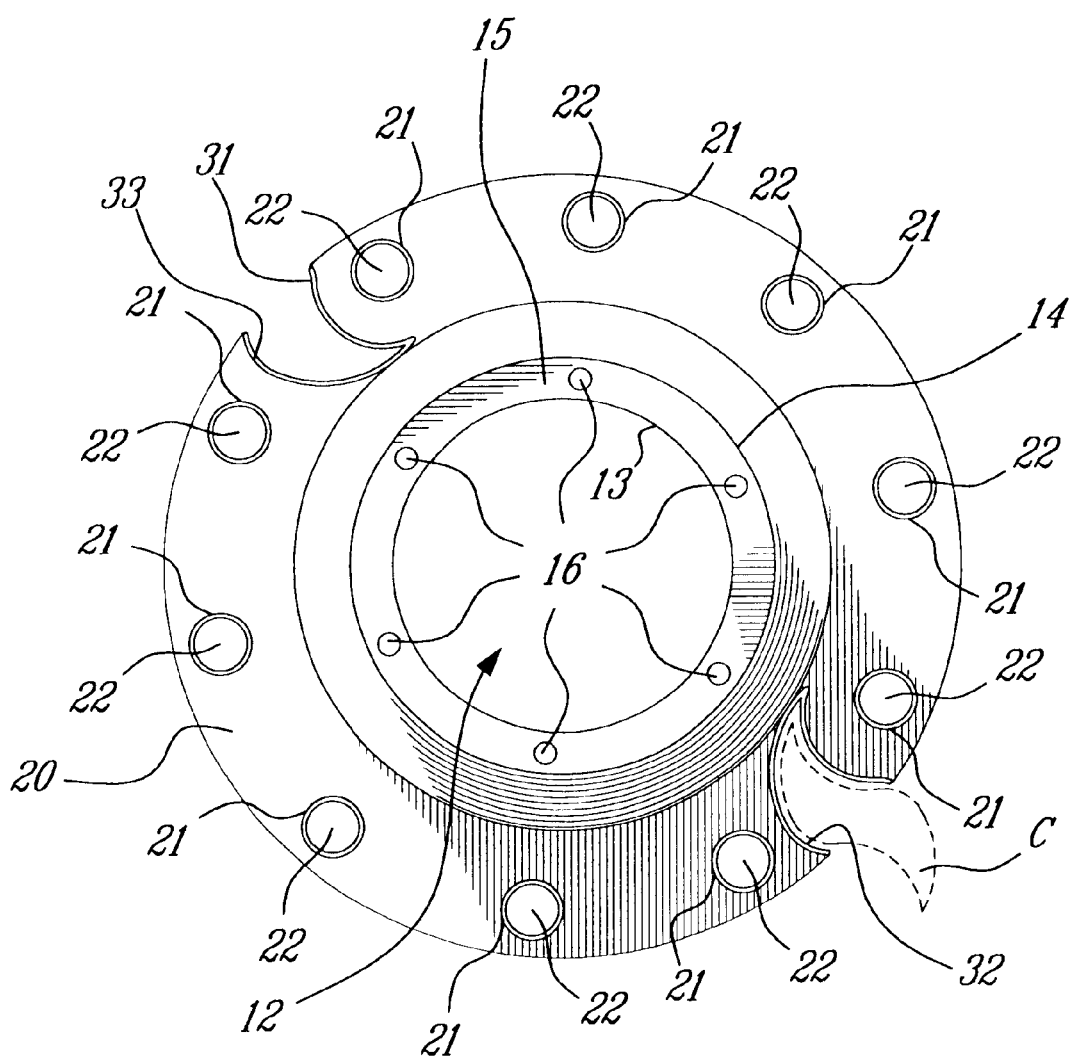
FIG. 4 is a side elevational view of the truck/trailer hub illustrated in FIG. 3.

Referring now to FIGS. 3 and 4, a truck/trailer hub in accordance with the present invention is generally shown at 10. The hub 10 is similar to the truck/trailer hub 1 of the prior art as described hereinabove, and thus, like numerals will designate like elements. The hub 10 has a first notch 30 configured on the flange 20 thereof. The wheel assembly typically comprises a wheel having at least a tire mounted thereto, along with a brake drum. The first notch 30 defines a half-crescent shape and is positioned between an adjacent pair of the throughbores 21. A second notch 31, the purpose of which will be described later, is located on an opposed side of the flange 20 and is a mirror image of the first notch 30. Lips 32 and 33 may be added on the periphery of the notches 31 and 32, respectively, such as to strengthen the flange 20 in the notch regions.

Figure 5:
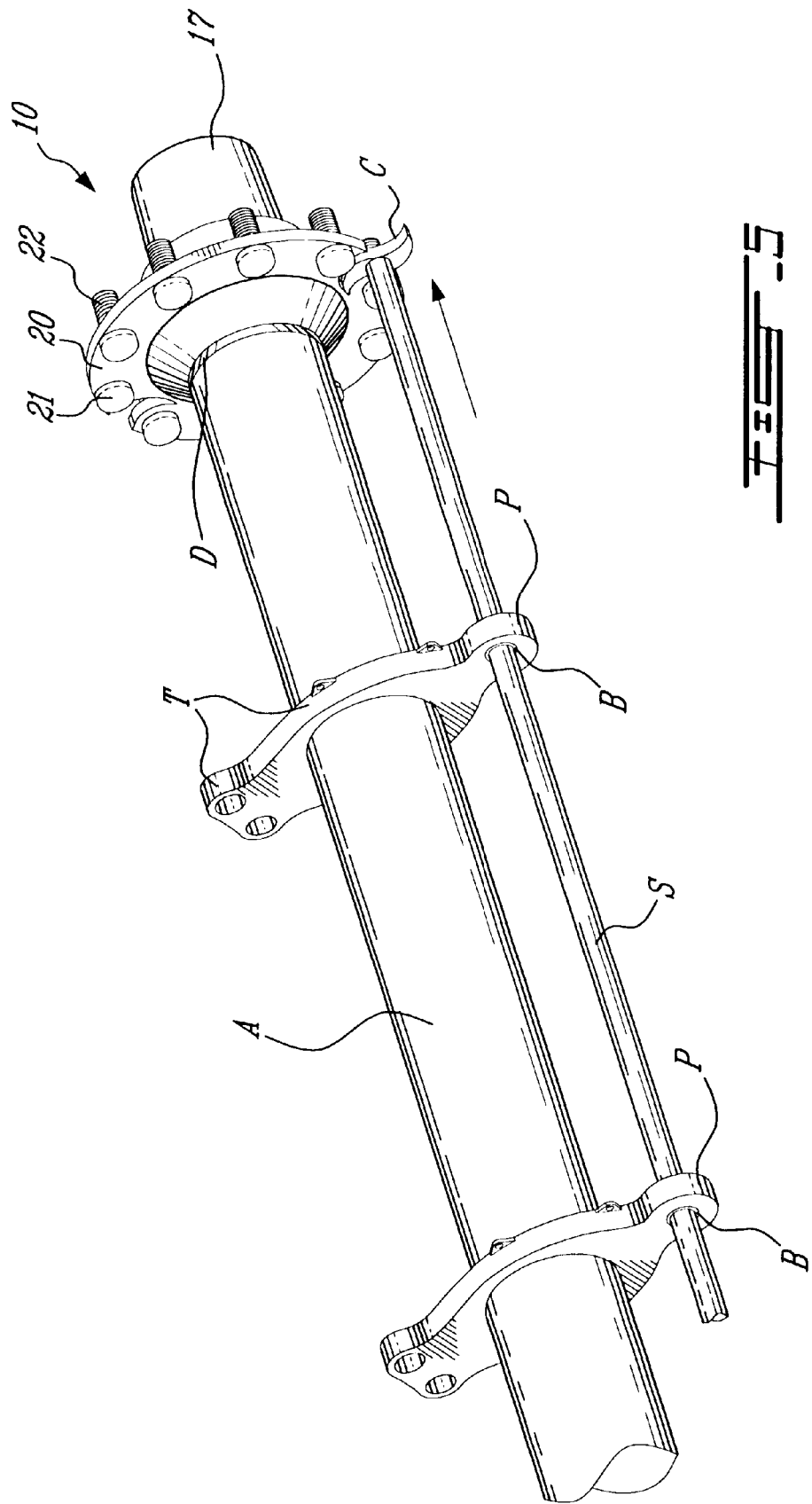
FIG. 5 is a perspective view of the truck/trailer hub of FIG. 3 mounted on a truck/trailer axle.

Referring now to FIG. 5, the hub 10 is shown mounted to the truck/trailer axle A. It is observed that the cam shaft S and the S-cam C at an end thereof are being removed from the pillow blocks P, such that, for instance, the bushings B and/or the cam shaft S can be attended to. As best shown in FIG. 4, the first notch 30 allows for the cam shaft S to be pulled out of the pillow blocks P without the truck/trailer hub 10 having to be removed from the truck/trailer axle A by reproducing the half-crescent shape of the portion of the S-cam C previously obstructed by the flange 20 of the hub 1 of the prior art. Once the first notch 30 is aligned with the S-cam C, by being rotated accordingly about the axle A, the cam shaft S may be pulled out of the pillow blocks P, whereby the bushings B are accessible and may be changed.

The second notch 31 serves the same purpose, but for wheels on the opposed side of the truck/trailer, where the S-cam C and flange 20 relation is opposite than that of the first side, whereby symmetrical notch is required for removing the cam shafts. It is pointed out that the hub 10 may be provided in a pair of models, one of which would have only the first notch 30, whereas the other model would have only the second notch 31. However, providing a hub having both notch 30 and 31 would simplify inventory and model identification issues.

As a result of the notch 30 and 31, a substantial amount of labour is saved in the replacement of the cam shaft S and/or the bushings B, as the hub no longer requires to be removed from the axle A and the previous step of changing lubricant fluids and retorquing fastening elements is also eliminated. The seals and gasket are thus not required to be changed as would be the case if the hub 10 were removed.

Thus, the hub 10 of the present invention allows for the total life utilization of the wheel seals, whereby maintenance costs are lowered. Similarly, a lubricating fluid change is no longer required in cam shaft S and/or bushings B repairs.

It is pointed out that the hub 10 of the present invention does not change current wheel designs. Although the hubs found on the market may be casted to varying shapes, they are similar in having a flange and ten throughbores therein of standard dimensions and location, whereby notches are not restricted to being provided on the models of hubs illustrated in FIGS. 3 to 6.

The S-cam C illustrated herein above represents the S-cam used with extended service air brakes, which provide thicker brake shoes for an extended life. The first and second notches 30 and 31, though being illustrated as being adapted for extended service air brakes S-cams, may also be shaped for being used with various configurations of S-cams.

It is within the ambit of the present invention to cover any obvious modifications of the embodiments described herein, provided such modifications fall within the scope of the appended claims.

I claim:

1. A hub for at least one of a truck or trailer of the type having a generally cylindrical portion defining an aperture, whereby said hub is adapted for mounting on a spindle of an axle such as to be free to rotate on the spindle, said hub having a flange projecting outwardly from an outer surface of said cylindrical portion, said flange comprising a plurality of throughbores therein, whereby the flange is adapted for securing a wheel and brake drum assembly thereto, such that the wheel and brake drum assembly can rotate with said hub and brake therewith when a brake member of the axle is actuated on a portion of the wheel and brake drum assembly by a cam shaft; said flange having at least a notch therein such that the cam shaft may be removed by pulling it through said notch without said hub requiring to be removed from the spindle.

2. The hub according to claim 1, wherein said flange comprises a pair of said notch, each notch being a mirror image of the other.

3. The hub according to claim 1, wherein each said notch defines a generally half-crescent shape for allowing an S-cam secured to the cam shaft to be removed from the axle by having a portion of the S-cam as well as at least a portion of the cam shaft to pass through one of said notches.

4. The hub according to claim 1, wherein said flanges comprise lips surrounding a periphery of each said notch such as to reinforce said flange.

5. A method for removing a brake actuating cam shaft from an axle of one of a truck or trailer, comprising the steps of:

(i) removing a wheel and brake drum assembly mounted on a hub of an axle;

(ii) aligning a notch in said hub with said cam shaft by rotating said hub about the axle; and (iii) removing said cam shaft from said axle by pulling said cam shaft through said notch.

6. The method according to claim 5, wherein said cam shaft has a brake actuating S-cam secured to an end thereof, said step (ii) comprising aligning said notch for passage of a portion of said S-cam as well as at least a portion of said cam shaft therethrough.

* * * * *